INVENTOR.
JOHN G. MICHELA
BY Gustave Miller
ATTORNEY.

Sept. 19, 1950      J. G. MICHELA      2,523,044
GLASS WINDOW HURRICANE PROTECTOR
Filed March 8, 1948      2 Sheets-Sheet 2
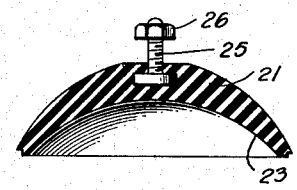
Fig. 3.
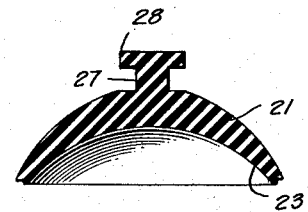
Fig. 4.
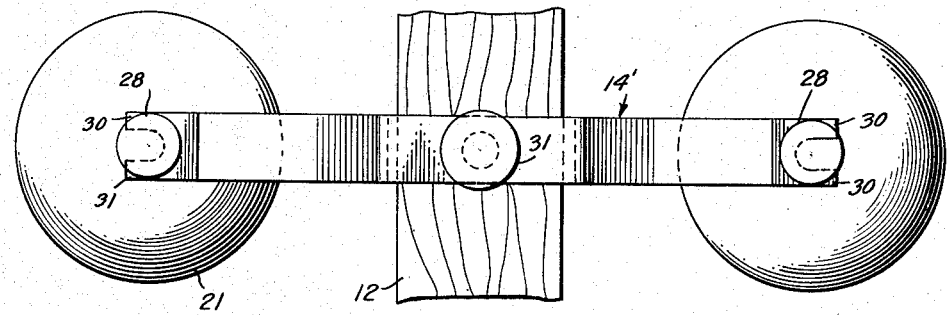
Fig. 5.
Fig. 7.      Fig. 6.
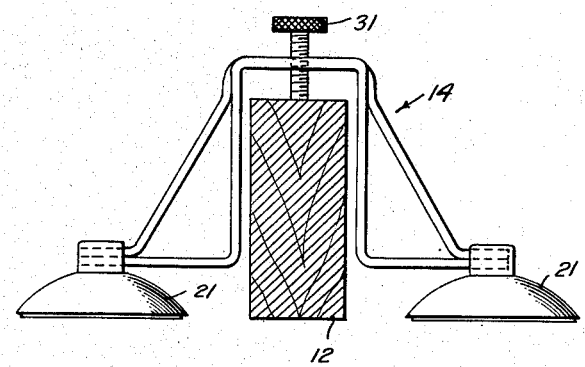
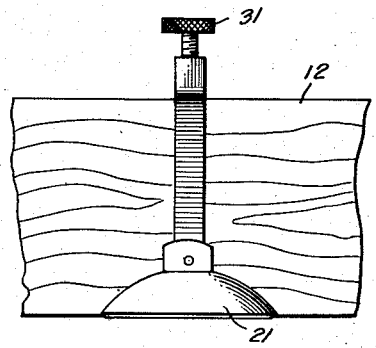
INVENTOR.
JOHN G. MICHELA
BY Gustave Miller
ATTORNEY.

Patented Sept. 19, 1950

2,523,044

UNITED STATES PATENT OFFICE 2,523,044

GLASS WINDOW HURRICANE PROTECTOR

John G. Michela, St. Petersburg, Fla.

Application March 8, 1948, Serial No. 13,705

8 Claims. (Cl. 20—40)

This invention relates to a protector for glass windows, plate or otherwise, and has for an object to provide a protector easily applicable to windows, on either side, to prevent such windows from breaking under stresses and strains caused by sudden changes in air pressures, such as usually accompany hurricanes or other atmospheric disturbances.

A further object of this invention is to provide a readily applicable window protector which is applied directly to the window glass itself, and supplies sufficient reinforcement to such a substantial area of the glass surface that it is practically impossible for the window to be stressed beyond its breaking limit under atmospheric pressure changes induced by a hurricane.

A further object of this invention is to provide a window protector which applies substantial reinforcement to a very substantial area of the window, rather than in merely isolated individual spots as in prior art.

A further object of this invention is to provide a window protector which is secured to the glass window itself, and which holds a substantial reinforcing bar tightly against the window surface to prevent the window from yielding under pressure stresses to beyond its breaking limit.

A further object of this invention is to provide a window protector which may be applied to the window with great rapidity as may often be necessary in the absence of sufficient advance notice of a storm, and which may be both applied and removed without the necessity of any tools.

A still further object of this invention is to provide an attaching bracket for the window protector, which bracket may be varied in minor details.

With the foregoing and other objects in view, as will hereinafter become apparent, this invention comprises the constructions, combinations, and arrangement of parts hereinafter set forth, claimed and illustrated in the accompanying drawings, wherein:

Fig. 3 is a sectional view of a modified vacuum cup;

Fig. 4 is a sectional view of still another vacuum cup;

Fig. 5 is an enlarged plan view of a window attaching bracket;

Fig. 6 is an end view of Figure 5, and

Fig. 7 is a side view of Figure 5.

Figure 1:
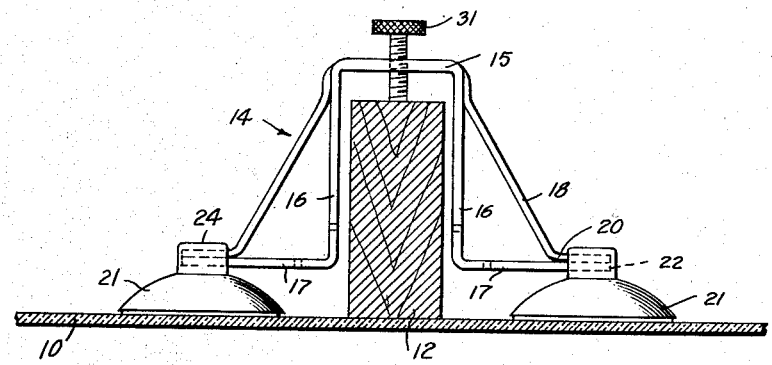
Fig. 1 is a sectional view on line 1—1 of Fig. 2, showing the window protector of this invention applied to one side of a window being protected.

There is shown at 10 a window glass mounted in any conventional manner in a window frame 11. Normally, such window frame 11, supporting the glass 10 about its edges, is sufficient to protect the glass 10 against breaking under stress and strains induced by normal atmospheric pressure changes, but in certain areas, hurricanes are liable to occur during certain seasons of the year, often without much advance notice. Under such circumstances, the glass 10 with no other protection than the frame 11 would invariably be broken, and it has become customary to provide additional protection when a hurricane is expected; usually by boarding over, or placing shutters over the glass, as disclosed in U. S. Patent No. 2,150,280; and more recently by attaching spot reinforcement to one or more central spots on the glass as shown in U. S. Patents: 1,460,645; 1,731,114; 2,025,161; and 2,417,233 amongst others. This spot protection is also supported from the window frame itself, as shown in these patents. In the present invention, the glass is provided with area protection, rather than spot protection, and while such area protection covers a far greater percentage of the window glass surface than the spot protection, it still permits the window to serve its purpose as a display window. The invention consists in adjustably attaching one or more reinforcing bars, such as a rectangular piece of timber, 2" by 4", or of other suitable material, shown at 12. Such timber bars are readily available everywhere, and may be procured locally. Such bars 12 are to be secured to the window glass 10 by means of brackets 14 securable to the window surface by means of vacuum cups 15, the end brackets 14 being as close to the window frame members as possible.

Figure 2:
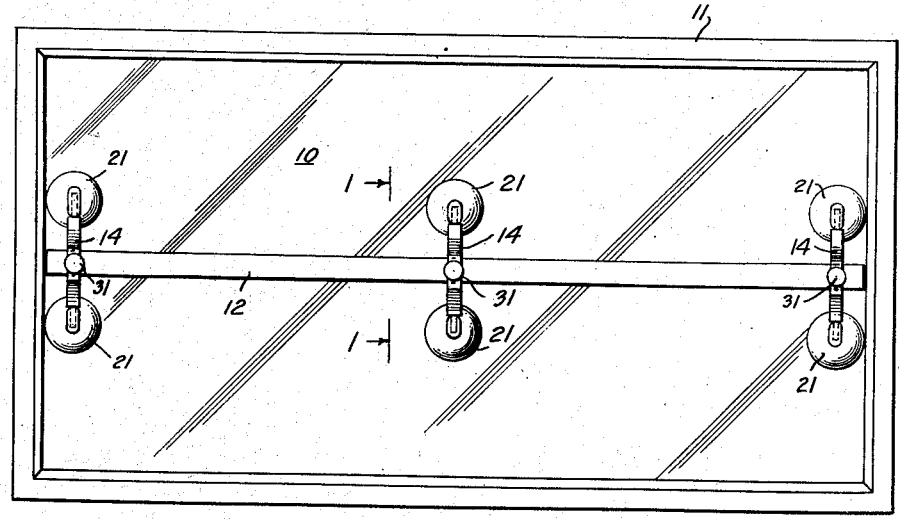
Fig. 2 is a plan view of a window to which a window protector of this invention has been applied.

Three or more brackets 14 are provided for each bar 12, according to the size of the window 10 to be protected, and such protecting bars 12 should extend to the opposite ends of the glass 10, as shown in Fig. 2. As shown, each bracket may be made of strap iron, formed in the shape of a U consisting of the bight 15 and the legs 16, but having arms 17 extending oppositely from each other at the ends of the legs 16, the arms 17 forming right angles with the legs 16. Reinforcing braces 18 may be welded across the angle, the ends 20 of the braces 18 being bent at an angle to be parallel to the arm and to the leg to which they are welded.

Vacuum cups 21 are provided for the other ends 22 of each of the bracket arms 17. These vacuum cups 21 are of fairly heavy resilient rubber, and consist of a cup portion 23 and an outer center tab or knob 24 to cooperate with the outer end 22 of the bracket arm 17 in securing the cups to the bracket arms. As shown in Figs. 1, 2, 6 and 7, these outer ends 22 of the arms 17 have been reduced in width so that they may extend laterally through the knobs 24 being held therein by the resiliency of the rubber of the vacuum cup.

In Fig. 3, the cup securing knob is in the form of a stud bolt 25 and nut 26, while in Fig. 4, the knob is in the form of a T-headed stem 27 with its head 28. In both forms, of Fig. 3 and Fig. 4, the bracket arm ends are bifurcated, as at 30, so as to cooperate with the shank of the stub bolt or the T-stem, as shown in Fig. 5. In either form of bracket and vacuum cup 21, the cup may be pressed against the glass 10 to securely hold the bracket 14 or 14' firmly in position thereagainst.

A thumb screw 31 is threaded through the bight 15 of the bracket 14, and rectangular bar 12 is adjusted against the glass 10 by tightening the thumb screw 31 through the bracket bight 15 against the bar 12. As shown in Fig. 2, the bar 12 should have at least three of the brackets 14 to hold it firmly against the surface of the glass 10.

The protector is intended for use on either the inside or the outside of the glass 10 to be protected, but use on the inside surface is preferred for two reasons. First, the heaviest pressure is usually outside and the protector resists the pressure best when applied on the inside of the building when the end brackets 14 are attached at the extreme ends of the glass surface, as shown in Fig. 2 of the drawing. Second, the purpose of the center bracket, and more than one bracket, properly spaced apart may be used instead, is to hold the glass securely to the bar or bracing member 12 so that the glass may not be pushed out due to internal pressures.

On a large sheet of glass, as many bars 12 as desired or needed could be placed on either side of the glass, thus providing a large reinforcing area over the surface of the glass, more than sufficient to enable the glass to resist any difference in air pressure on opposite sides and thus prevent it from yielding to beyond its breaking limit, thus riding out of the hurricane in safety. Afterwards, the thumb screws 31 are loosened, enabling the bars 12 to be easily removed. Inasmuch as tightening the thumb screws originally serves to press the bars 12 against the glass surface and simultaneously through the bracket arms 17 and knobs 24, to pull the centers of the cups away from the glass surface and thus cause the cups to grip even more firmly, loosening the thumb screws 31 will relieve the pull on the knobs and thus loosen the grip of the cups 21 on the glass, enabling the cups to be readily removed from the glass surface. The brackets and bars may then be stored away until needed again, whereupon they can be quickly replaced on the window. Even when in use and a large area of the glass surface is reinforced, the use of the window for display purposes is only slightly interfered with.

While the device has been shown and the structure described in detail, it is obvious that this invention is not to be considered limited to the exact form disclosed, and that changes may be made therein within the scope of what is claimed, without departing from the spirit of the invention.

Having thus set forth and disclosed the nature of this invention, what is claimed is:

1. A window glass hurricane protector comprising a bar of substantial area and a plurality of brackets arranged to cling to the glass surface, and means secured to said brackets to press the bar against the glass surface.

2. A window glass hurricane protector comprising a bar of substantial area and a plurality of brackets adapted to cling to the glass surface, and means secured to said brackets to adjustably press the bar against the glass surface and simultaneously increase the clinging grip of said bracket to the glass surface.

3. A window glass hurricane protector comprising a bar of substantial area and a plurality of brackets arranged to cling to the glass surface, each of said brackets comprising a strap metal member arranged to be extended over the outer side of the bar, a thumb screw extendable through said strap metal member against said outer side of said bar, and a pair of vacuum cups each having its back mounted on an end of said strap metal member, for clinging to the glass surface, whereby tightening of the thumb screw pushes the bar against the glass surface and pulls the back of the vacuum cup somewhat away from the glass surface to increase the gripping effect of the cup on the glass surface.

4. A window glass hurricane protector comprising a bar of substantial area and a plurality of brackets arranged to cling to the glass surface, each of said brackets comprising a strap metal member arranged to be extended over the outer side of the bar, a thumb screw extendable through said strap metal member against said outer side of said bar, and a pair of vacuum cups each having its back mounted on an end of said strap metal member for clinging to the glass surface, whereby tightening of the thumb screw pushes the bar against the glass surface and pulls the back of the vacuum cup somewhat away from the glass surface to increase the gripping effect of the cup on the glass surface, said strap metal member being of U-shape with outwardly extending arms forming angles with the U-legs, said thumb screw being threaded through the bight of the U, and brace straps welded across the angle between the arms and the legs.

5. A window glass hurricane protector comprising a bar of substantial area and a plurality of brackets arranged to cling to the glass surface, means secured to said brackets to press the bar against the glass surface, each of said brackets comprising a strap metal member arranged to be extended over the outer side of the bar, said means comprising a thumb screw extendable through said strap metal member against said outer side of said bar, said strap metal member being of U-shape with outwardly extending arms forming angles with the U-legs, said thumb screw being threaded through the bight of the U, and brace straps welded across the angle between the arms and the legs.

6. For use in a window glass hurricane protector having a bar of substantial area, a bracket comprising a U-shaped metal strap member having arms extending parallel to the U-bight and at right angles from the ends of the U-legs, a vacuum cup arranged to cling to the glass surface mounted on the free end of each of said arms by means of a knob on the outside of its back, and a thumb screw threaded through the U-bight of said bracket, the U of said bracket being arranged to extend about the bar and having the thumb screw adjustably press the bar against the glass surface and simultaneously pull the back of the vacuum somewhat away from the glass surface and thus increase the clinging grip of said bracket to the glass surface.

7. For use in a window glass hurricane protector having a bar of substantial area, a bracket comprising a U-shaped metal strap member having arms extending parallel to the U bight and at right angles from the ends of the U legs, brace straps connecting the bight ends of the legs to the free ends of said arms, a vacuum cup arranged to cling to the glass surface mounted on the free end of each of said arms by means of a knob on the outside of its back, and a thumb screw threaded through the U bight of said bracket, the U of said bracket being arranged to extend about the bar and have the thumb screw adjustably press the bar against the glass surface and simultaneously pull the back of the vacuum cup somewhat away from the glass surface and thus increase the clinging grip of said bracket to the glass surface.

8. A window glass hurricane protector comprising a bar of substantial area and of a length substantially equal to the length of the exposed surface of the glass to be protected, and a plurality of brackets arranged to cling to the glass surface, one of said brackets being arranged at each end of said bar adjacent the window frame, and at least one bracket arranged intermediate and substantially equally spaced from said end brackets, and means secured to said brackets to press said bar against the glass surface.

JOHN G. MICHELA.

REFERENCES CITED

The following references are of record in the file of this patent:

UNITED STATES PATENTS

| Number | Name | Date |
|--------|------|------|
| 810,604 | Baier | Jan. 23, 1906 |

FOREIGN PATENTS

| Number | Country | Date |
|--------|---------|------|
| 646,523 | Germany | 1937 |